(12) United States Patent
Fendt et al.

(10) Patent No.: US 6,271,747 B1
(45) Date of Patent: Aug. 7, 2001

(54) METHOD FOR ADJUSTING THE TRIGGER THRESHOLD OF VEHICLE OCCUPANT PROTECTION DEVICES

(75) Inventors: Guenter Fendt, Schrobenhausen; Richard Baur, Pfaffenhofen; Michael Bischoff, Adelschlag; Stephan Schwehr, Nuernberg; Peter Steiner, Schrobenhausen; Helmut Steurer, Junkershofen, all of (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/638,490

(22) Filed: Aug. 14, 2000

Related U.S. Application Data

(63) Continuation-in-part of application No. 09/294,654, filed on Apr. 19, 1999.

(30) Foreign Application Priority Data

Apr. 18, 1998 (DE) .............................................. 198 17 334

(51) Int. Cl.⁷ ....................................................... B60Q 1/00
(52) U.S. Cl. .......................... 340/436; 307/10.1; 342/70; 701/45
(58) Field of Search ................................... 340/436, 435, 340/903; 307/10.1, 9.1; 342/70, 71, 72; 180/282; 280/734; 701/45

(56) References Cited

U.S. PATENT DOCUMENTS

| | | |
|---|---|---|
| 3,778,823 | 12/1973 | Sato et al. . |
| 5,285,188 | 2/1994 | Yoshida . |
| 5,390,951 | 2/1995 | Iyoda . |
| 5,626,359 | 5/1997 | Steffens, Jr. et al. . |
| 5,748,477 | 5/1998 | Katoh . |
| 5,826,216 * | 10/1998 | Lyons et al. .......................... 702/143 |
| 5,835,007 * | 11/1998 | Kosiak ................................. 340/436 |
| 5,872,536 * | 2/1999 | Lyons et al. ........................... 342/70 |
| 5,904,368 | 5/1999 | Blackburn et al. . |
| 5,906,393 | 5/1999 | Mazur et al. . |
| 5,935,182 * | 8/1999 | Foo et al. ............................... 701/45 |
| 5,936,549 | 8/1999 | Tsuchiya . |
| 5,959,552 * | 9/1999 | Cho ..................................... 340/903 |
| 6,031,484 * | 2/2000 | Bullinger et al. ...................... 342/72 |

FOREIGN PATENT DOCUMENTS

| | | |
|---|---|---|
| 4220270 | 12/1993 | (DE) . |
| 4324753 | 3/1994 | (DE) . |
| G9215383 | 4/1994 | (DE) . |
| 0728624 | 8/1996 | (EP) . |
| 0763724 | 3/1997 | (EP) . |
| WO 95/05608 | 2/1995 | (WO) . |

* cited by examiner

Primary Examiner—Nina Tong
(74) Attorney, Agent, or Firm—W. F. Fasse; W. G. Fasse

(57) ABSTRACT

The safety of occupants in a vehicle is increased by avoiding an unnecessary deployment of a safety device, such as an air bag in the vehicle. For this purpose the trigger signal for deploying the safety device is generated either in response to a vehicle motion signal exceeding a high threshold level or in response to the vehicle motion signal exceeding a low threshold level as determined by a precrash signal (S1) followed by a crash signal (S2) preferably within a limited time duration ($T_{MAX}$). For this purpose the signals (S1) and (S2) are logically linked and the resulting signal at the output of an AND-gate or at the output of a timing circuit determines whether the vehicle motion signal is compared with the high threshold level or with the low threshold level for generating the trigger or deployment signal (DS). Only when this double condition occurs, is the trigger threshold lowered for deploying the safety device. An optical sensor is preferably used as the crash signal generator.

12 Claims, 2 Drawing Sheets

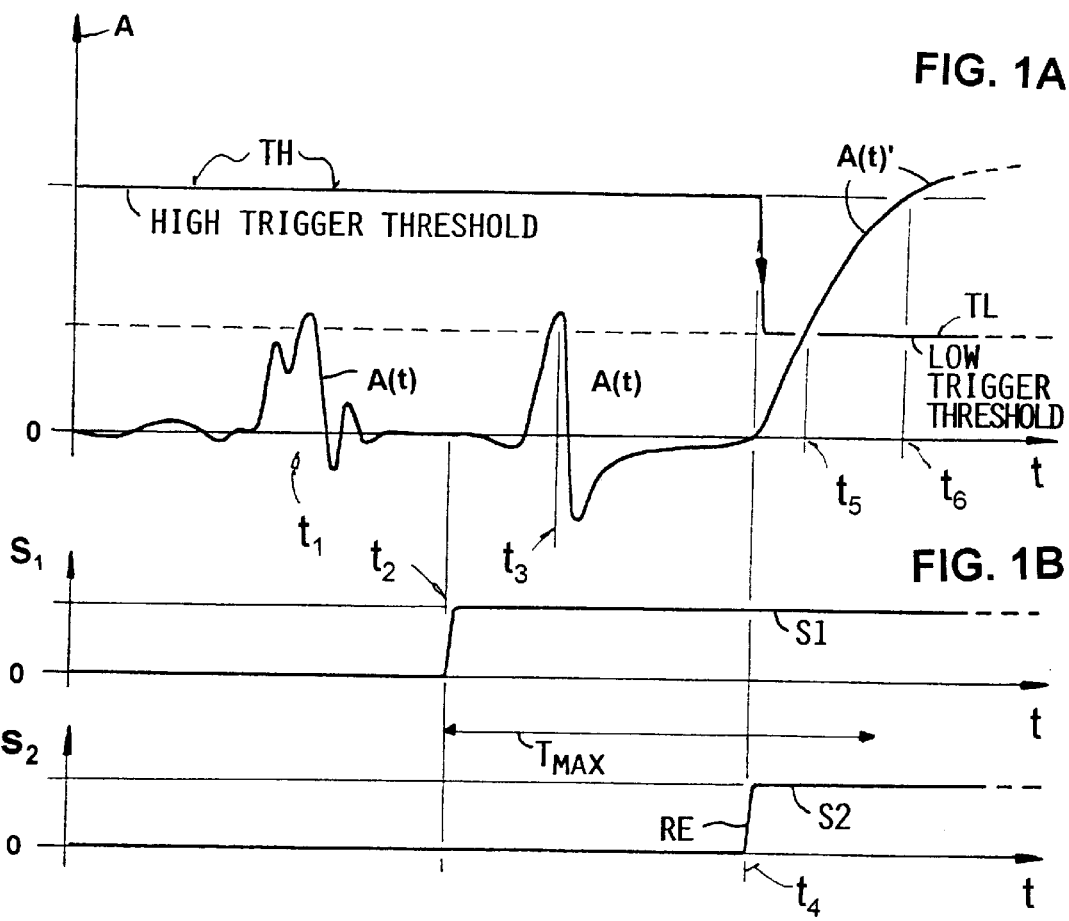
FIG. 1A
FIG. 1B
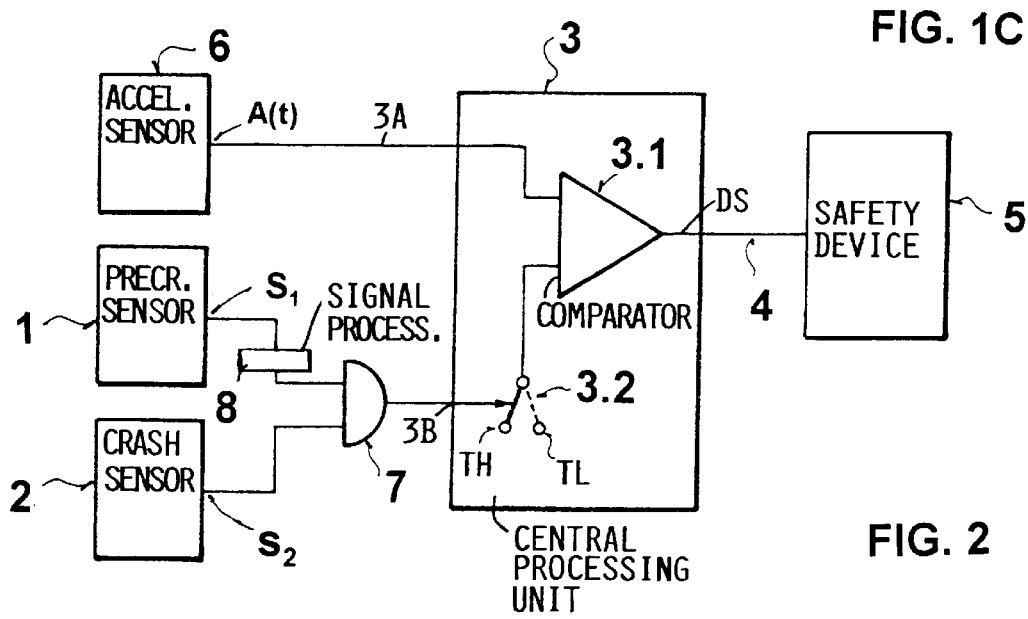
FIG. 1C
FIG. 2

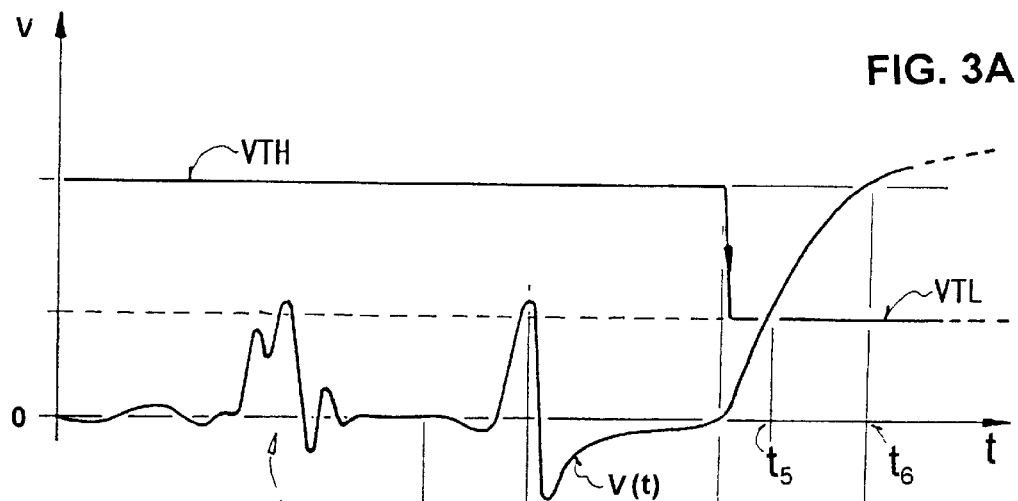
FIG. 3A
FIG. 3B
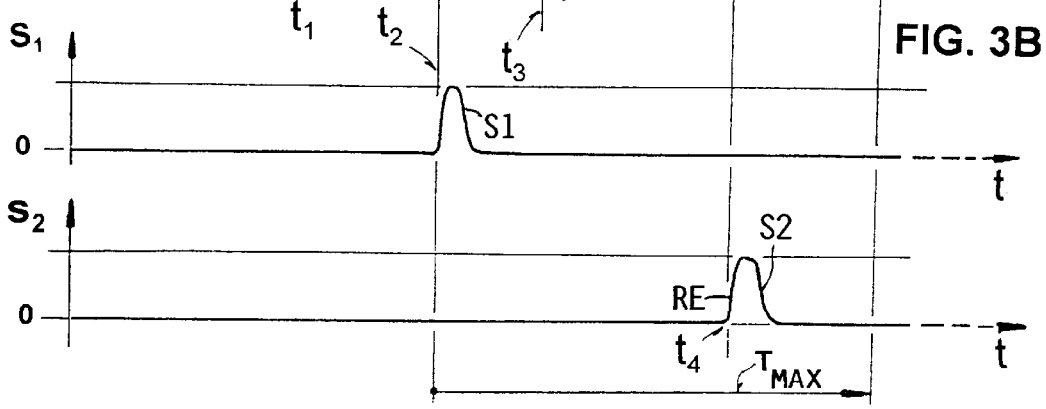
FIG. 3C
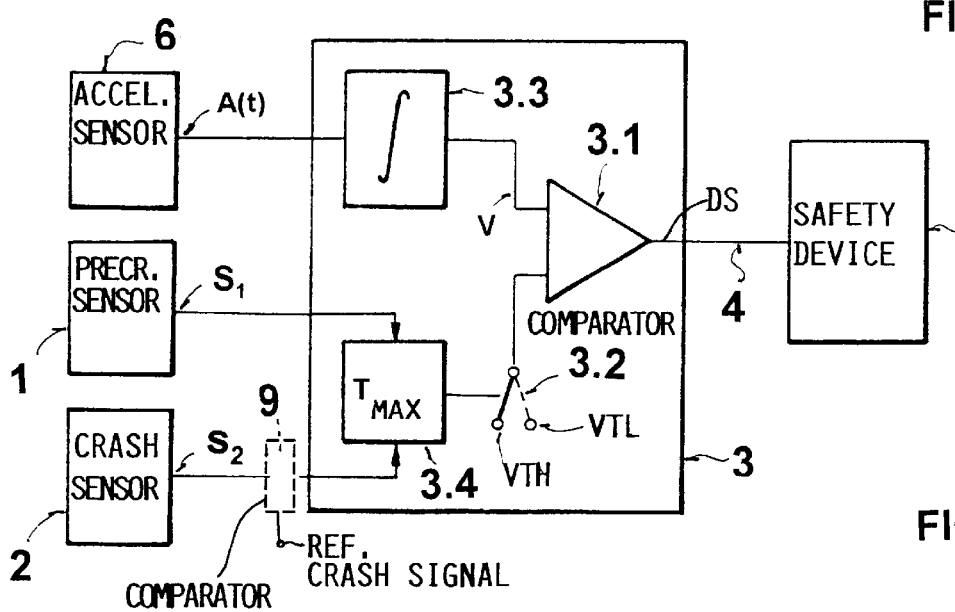
FIG. 4

METHOD FOR ADJUSTING THE TRIGGER THRESHOLD OF VEHICLE OCCUPANT PROTECTION DEVICES

CROSS-REFERENCE TO RELATED APPLICATION

This application is a Continuation-In-Part of our copending U.S. application Ser. No. 09/294,654 filed on Apr. 19, 1999.

PRIORITY CLAIM

This application is based on and claims the priority under 35 U.S.C. §119 of German Patent Application No.: 198 17 334.2; filed on: Apr. 18, 1998, the entire disclosure of which is incorporated herein by reference.

FIELD OF THE INVENTION

The invention relates to a method for preventing a premature deployment of a protection device for occupants in a vehicle.

BACKGROUND INFORMATION

European Patent Publication EP 0,728,624 A2 relates to a method and apparatus for controlling an actuatable restraining device using predictive crash sensing. The predictive crash sensor, referred to herein as precrash sensor, is a radar system which detects targets located within a perimeter around the vehicle. The system determines three parameters, namely relative distance or target range, relative speed or target closing velocity and the angle of incidence. The trigger threshold is varied in response to at least one of these three parameters. The trigger threshold is compared with an acceleration integral or velocity signal referred to as a determined crash value which represents an estimated impact, but not an actual impact. Accordingly, the known vehicle occupant protection system is prone to a premature deployment of the restraining device. The known system can be triggered at lower acceleration or acceleration integral signals than is necessary or even safe. Further, the precrash sensors have proven to be prone to faults and are not suitable for all traffic situations. In particular, if the distances between the vehicle and the respective targets are very short for instance, when overtaking, when the lanes are narrow, or when driving along a crash barrier, or when unusual objects, for instance, a cardboard box or the like are present on the road, incorrect sensor evaluations may occur. In such a situation, the trigger threshold will be lowered so far that even a slight contact between both objects, a violent vehicle braking maneuver or even road vibrations may suffice to trigger the vehicle occupant protection device even when such triggering and deployment of the safety device is not yet needed for vehicle occupant protection. To the contrary, such premature deployment will obstruct the driver who will no longer be able to safely drive the vehicle in this hazardous situation, thus making a dangerous situation even more dangerous.

German Patent Publication DE 42 20 270 A1 discloses a vehicle occupant protection device that uses at least one acceleration sensor (11) and at least one deformation sensitive sensor (12). In the preferred embodiment at least two deformation sensitive sensors are arranged in a row for lateral impact detection. A signal processing unit (10) is provided which evaluates the signals from the deformation sensitive sensors which respond relatively early in the course of an impact, for providing a signal that reduces the response sensitivity of the at least one acceleration sensor in order to make it more sensitive. By arranging the two deformation sensitive sensors in a row, it is possible to gain information regarding the force and velocity of an impact when the spacing between the two sensors is known. A precrash signal as such is not employed according to this German Patent Publication DE 42 20 270 A1.

The two deformation-sensitive sensors may become active only when the impact actually occurs; therefore, they are impact or crash sensors and not precrash sensors, even though an "early warning function" can be implemented due to the spatially separate location of the sensor located closest to the exterior side of the vehicle. In addition to the "deviating sensor concept" in comparison to precrash sensors, the time interval between the signal from the outer crash sensor and the signal from the inwardly positioned crash sensor is much shorter than a time interval between signals from other sources such as precrash sensors. Therefore, precrash sensors offer significant safety benefits.

U.S. Pat. No. 5,285,188 (Yoshida) teaches processing a signal from a precrash sensor (11), referred to as a vehicle collision predicting unit and a signal from an impact sensor (30) for providing a collision signal. The two signals pass through an AND-gate to provide a trigger signal at the output of the AND-gate for the immediate deployment of the safety device when the distance between the two vehicles or an obstacle and the vehicle becomes zero within a predetermined time. A response threshold for the safety device trigger signal is not lowered.

German Patent Publication DE OS 43 24 753 A1 discloses a deployment mechanism for a safety device in a vehicle to protect passengers. Two sensors cooperate with each other for the deployment of a side air bag. A deformation or crash sensor is mounted either in the outer skin or directly behind the outer skin of the side of the vehicle body and a cross acceleration sensor is mounted centrally along the longitudinal vehicle axis. The evaluation of the signals from the deformation sensor or crash sensor starts the evaluation of the cross acceleration signal, whereby the response threshold is reduced to increase the sensitivity at the time of impact. The reduction of the threshold, or rather the increase of the sensitivity is made commensurate to the size of the deformation velocity. The combination of precrash signals with crash signals is not disclosed.

German Utility Model Publication G 92 15 383.6 discloses a sensor for evaluating optical signals that can be used for the present purposes. Similarly, European Patent Publication EP 0,763,724 A1 discloses a fiber optical load sensor suitable for the present purposes.

OBJECTS OF THE INVENTION

In view of the above it is the aim of the invention to achieve the following objects singly or in combination:

to control the trigger threshold or response sensitivity of a safety device deployment system in such a way that premature deployments and late deployments are avoided;

to combine a precrash signal with a crash signal in such a way that the deployment of the safety device is prevented in response to minor impacts while assuring the timely deployment in response to crash signals representing impacts that are severe enough to require deployment of the safety device;

to adjust the response sensitivity of the trigger circuit for the safety device to the level that is appropriate for the situation at hand which depends on how soon the crash signal follows the precrash signal;

to preset the crash sensor to a minimum crash force, thereby using a fiber optical load sensor having a very fast response characteristic; and to increase the sensitivity or lower the response threshold of the trigger circuit in response to the leading or rising edge of the crash signal to assure a timely deployment in response to an impact serious enough to warrant deployment.

SUMMARY OF THE INVENTION

The above objects have been achieved according to the invention by a method for preventing a premature deployment of a protection device for occupants of a vehicle, said method comprising the following steps:

(a) sensing a vehicle motion signal;

(b) sensing a precrash signal (S1);

(c) sensing a crash signal (S2);

(d) activating a high threshold level (TH, VTH) sufficiently high for preventing said premature deployment as long as said motion signal remains lower than said first high threshold level;

(e) linking said precrash signal (S1) and said crash signal (S2) for activating a low threshold level (TL, VTL) lower than said first high threshold level (TH, VTH) when said crash signal (S2) occurs following said precrash signal (S1); and (f) comparing said vehicle motion signal with said second lower threshold level (TL, VTL) for producing a deploying signal (DS) for said protection device when said vehicle motion signal exceeds said lower threshold level (TL, VTL) when said crash signal (S2) occurs following said precrash signal (S1).

According to the invention three signals are evaluated. The first signal is a vehicle motion signal such as an acceleration signal or a velocity signal derived by integrating the acceleration signal. The acceleration signal is in effect a negative acceleration caused by a braking action or by an impact, for example. The second signal is a precrash signal obtained for example by a distance measuring radar or the like. The third signal is a crash signal preferably obtained from a light conductor sensor capable of an extremely fast crash signal generation in response to a crash. The second and third signals are logically linked to provide either a high threshold level when the precrash signal is not followed by a crash signal preferably within an empirically ascertained time limit ($T_{MAX}$) or to provide a low threshold level when the crash signal follows the precrash signal, preferably within said time limit. The first signal namely the motion signal is compared with the high or low threshold levels to prevent or provide a deployment signal (DS) respectively. Preferably, the low threshold level is provided in response to the leading or rising edge (RE) of the crash signal to assure a rapid deployment when that is needed. Further, even if the crash signal should not follow the motion signal, a deployment signal will be generated any time the motion signal exceeds the high threshold level.

BRIEF DESCRIPTION OF THE DRAWINGS

In order that the invention may be clearly understood, it will now be described in connection with example embodiments, with reference to the accompanying drawings, wherein:

FIG. 1A illustrates acceleration signals A(t) as a function of time;

FIG. 1B shows a precrash signal S1, the effect of which is used within a time limit $T_{MAX}$;

FIG. 1C shows the occurrence of a crash signal S2 within the time limit $T_{MAX}$ following the precrash signal;

FIG. 2 illustrates a block circuit diagram for implementing the present method;

FIG. 3A is a velocity signal diagram as a function of time similar to the acceleration diagram of FIG. 1A;

FIG. 3B illustrates a precrash signal S1 as an impulse;

FIG. 3C illustrates a crash signal S2 also as an impulse; and

FIG. 4 illustrates a block circuit diagram similar to that of FIG. 2 for performing the present method based on the velocity signal.

DETAILED DESCRIPTION OF PREFERRED EXAMPLE EMBODIMENTS AND OF THE BEST MODE OF THE INVENTION

FIGS. 1A to 1B illustrate a possible time sequence for adjusting the trigger threshold. FIG. 1A shows an acceleration signal A(t) changing over time, a high trigger threshold TH, and a low trigger threshold TL. Additionally, and in a time-synchronous fashion, FIGS. 1B and 1C illustrate the precrash signal S1 and the crash signal S2 respectively.

The invention is based on the recognition that in a real emergency a crash signal S2 follows a precrash signal S1 within a time limit $T_{MAX}$ that can be empirically ascertained. If the crash signal S2 does not occur within this time limit following the precrash signal S1, it is certain that a crash will not occur based on any situation that caused the precrash signal S1.

At a point in time t1, the acceleration signal A(t), which represents, as mentioned, a vehicle motion signal, shows a fault condition which may have been caused, for instance, by vibrations of the vehicle. If the trigger threshold would be permanently kept at the low trigger threshold level TL, a protection device 5 would already be triggered at t1 in response to such low acceleration signals.

If at a point in time t2 a precrash sensor 1, which for instance is a radar system, detects an object within the safety-critical close perimeter of the vehicle, the precrash signal S1 occurs as shown in FIG. 1B at $t_2$. In conventional systems, the trigger threshold would now be lowered from its original high value TH to the low value TL. The invention recognizes that lowering the threshold at t2 is too early. At the point in time t3, there will again be a significant acceleration signal which can be traced back, for instance, to a braking maneuver or even slight contact with an object in the close perimeter. Conventional systems using a low trigger threshold TL already at time t2 would be triggered at t3, thereby depriving the driver of the opportunity to avert the hazard situation by specific and controlled steering movements and/or braking actions.

As is shown in FIGS. 1A, 1B, and 1C, the method according to the invention does not lower the trigger threshold solely due to the precrash signal S1. According to the invention the trigger threshold is lowered from TH to TL only if a crash sensor 2 transmits the crash signal S2 at an impact time, e.g. t4 as shown in FIG. 1C, preferably within the above-mentioned time limit $T_{MAX}$ following the occurrence of the precrash signal S1 at t2. The acceleration signal increases from impact time t4 as shown at A(t)' in FIG. 1A. At the time t5 the acceleration signal A(t)' becomes larger than the already lowered threshold TL thereby causing the deployment signal DS earlier than the time t6 when the acceleration signal becomes larger than the high threshold level TH. Thus, the device 5 is triggered significantly earlier, namely at time t5 instead of at time t6, if the original trigger threshold TH had been maintained. The evaluation of both the precrash signal S1 and the crash signal S2 therefore provides an additional safeguard as taught by the invention. Preferably, the rising edge RE of the crash signal S2 is used for controlling the lowering of the trigger threshold to TL at t4, safely prior to time t5.

FIG. 2 shows a block diagram of a vehicle occupant protection system for implementing the present method. A central processing unit 3 receives at its input 3A the vehicle motion signal such as the acceleration signal A(t) supplied by an acceleration sensor 6. The CPU 3 processes the acceleration signal for application to one input of a comparator 3.1. A trigger threshold level TH or TL is applied to the other input of the comparator 3.1. According to the invention the trigger threshold TH or TL is determined by the linking or combining of the precrash signal S1 provided by a respective sensor 1 and the crash signal S2 provided by a crash sensor 2. To this end, an input 3B of the central unit 3 is connected to the precrash sensor 1 and to the crash sensor 2 through an AND-gate 7. A signal processing circuit 8 assures that the precrash signal is effective at least for the duration $T_{MAX}$ shown in FIG. 1B, to open the AND-gate 7 for the crash signal S2 for switching the high trigger level TH to the low trigger level TL as shown symbolically at 3.2. At least one vehicle occupant protection device 5 is connected with the central unit 3 through a trigger or deployment signal conductor 4 to receive the deployment signal DS provided by the comparator 3.1.

It is possible to provide for several crash sensors 2 and/or vehicle occupant protection devices 5 within a vehicle occupant protection system. In this connection, a particularly preferred sensor will be a crash sensor in which, in the event of a crash, a crash force will act on an optical fiber arrangement to cause a change of the light output to be measured by a photometer at the light emission end of the optical fiber. The particular advantage of such a fiber optic crash sensor 2 is its high signal speed and the respective rapid change in the light output. In order to use this advantage effectively, the optical fiber arrangement will be installed to extend from the central unit 3 to a vehicle impact location for typical accident situations. However, a light transmitter and a photometer are installed preferably directly in the central unit 3, preferably in a side-by-side arrangement.

The crash signal S2 generated by the photometer in response to the measured light output is logically linked with the precrash signal S1 as described above and processed in the central unit 3. The signal processing circuit 8 has one input connected to the output of the precrash signal sensor 1 to receive the precrash signal S1. The output of the signal processing circuit 8 is connected to one input of the AND-gate 7. Another input of the AND-gate 7 is connected to the output of the crash sensor 2 to receive the crash signal S2.

In addition to the advantage of the high speed optical signal transmission, the optical conductor is free of any electrical currents which is important for its application in vehicle occupant protection systems because even if the optical fiber conductor is destroyed there will be no electrical short-circuits. Moreover, lowering of the threshold level at t4 prior to t5 is assured for an improved safety.

FIG. 3A shows a vehicle motion signal as a velocity waveform rather than an acceleration waveform. FIG. 3B shows the precrash signal S1 as an impulse of short duration. Similarly, FIG. 3C shows the crash signal S2 as an impulse of short duration. The time limit $T_{MAX}$ is started with the rising edge of the precrash signal S1 and continues, for example, to a point t6 when the rising velocity signal V(t) passes through the high velocity threshold VTH.

As shown in FIG. 4 the acceleration signal A(t) is integrated in an integration circuit 3.3 of the central processing unit and the respective velocity signal V is provided to one input of the comparator 3.1. The other input of the comparator 3.1 receives either the high velocity threshold VTH or the low velocity threshold VTL, e.g. through a switch symbolically shown at 3.2 which may be a switching circuit that is operated by an output signal from a timing circuit 3.4 that receives at one input the precrash signal S1 and at the other input the crash signal S2. The timing circuit 3.4 is so constructed that it will pass the crash signal S2 if the crash signal S2 follows the precrash signal S1, preferably within the time limit $T_{MAX}$ as discussed above. A comparator 9 may be provided between the output of the crash sensor 2 and the input of the timing circuit 3.4 for comparing the crash signal S2 with a reference crash signal to eliminate insignificant crash signals.

The just described functions can be realized by a microprocessor with a respective software program. A timely lowering of the threshold at $t_4$ is assured in response to the rising edge RE of the crash signal S2 as taught by the invention.

Although the invention has been described with reference to specific example embodiments, it will be appreciated that it is intended to cover all modifications and equivalents within the scope of the appended claims. It should also be understood that the present disclosure includes all possible combinations of any individual features recited in any of the appended claims.

What is claimed is:

1. A method for preventing a premature deployment of a protection device for occupants of a vehicle, said method comprising the following steps:
    (a) sensing a vehicle motion signal;
    (b) sensing a precrash signal (S1);
    (c) sensing a crash signal (S2);
    (d) generating a first high threshold level (TH, VTH) for preventing said premature deployment as long as said motion signal remains lower than said first high threshold level;
    (e) combining said precrash signal (S1) and said crash signal (S2) for activating a second low threshold level (TL, VTL) lower than said first high threshold level (TH, VTH) in response to said crash signal (S2) following said precrash signal (S1); and
    (f) comparing said vehicle motion signal with said second lower threshold level (TL, VTL) for producing a deployment signal (DS) for said protection device when said vehicle motion signal is higher than said second lower threshold level (TL, VTL) when said crash signal (S2) is following said precrash signal (S1).

2. The method of claim 1, wherein said step of combining is performed within a predetermined time duration ($T_{MAX}$) that is started by said precrash signal (S1).

3. The method of claim 2, further comprising the step of empirically defining said predetermined time duration ($T_{MAX}$).

4. The method of claim 1, further comprising the step of sensing said crash signal (S2) to provide an actual crash signal level, providing a predetermined crash signal level, comparing said actual crash signal level with said predetermined crash signal level, and lowering said first high threshold level (T, VTH) to said second lower threshold level (TL, VTL) if said actual crash signal level is higher than said predetermined crash signal level.

5. The method of claim 1, further comprising the step of sensing said crash signal (S2) by means of a fiber optical load sensor.

6. The method of claim 1, wherein said step of combining said precrash signal (S1) and said crash signal (S2) comprises maintaining said precrash signal for a predetermined time duration ($T_{MAX}$), and generating a threshold level control signal in response to said crash signal (S2) following said precrash signal (S1) within said predetermined time duration ($T_{MAX}$).

7. The method of claim 6, further comprising the step of processing said precrash signal (S1) to provide a processed precrash signal and supplying said processed precrash signal to one input of an AND-gate (7) and supplying said crash signal (S2) to another input of said AND-gate (7) for producing said threshold level control signal at an output of said AND-gate (7).

8. The method of claim 6, wherein said vehicle motion signal is an acceleration signal A(t), said method further comprising the step of comparing said acceleration signal A(t) with said first high threshold level (TH) when said precrash signal (S1) is not followed by said crash signal (S2) within a predetermined time, and comparing said acceleration signal with said second lower threshold level (TL) when said precrash signal (S1) is followed by said crash signal (S2) within said predetermined time for generating said deployment signal (DS) if said vehicle motion signal is higher than said second lower threshold level (TL).

9. The method of claim 8, further comprising the step of integrating said acceleration signal A(t) to provide a velocity signal (V) as said vehicle motion signal, comparing said velocity signal (V) with said first high threshold level (VTH) when said precrash signal (S) is not followed by said crash signal (S2), and further comparing said velocity signal (V) with said second lower threshold level (VTL) when said precrash signal (S1) is followed by said crash signal (S2) for generating said deployment signal (DS) if said vehicle motion signal is higher than said second lower threshold level (VTL).

10. The method of claim 1, wherein said step of combining said precrash signal (S1) and said crash signal (S2) comprises starting a timing circuit (3.4) by said precrash signal (S1) and supply said crash signal (S2) to said timing circuit within a predetermined time duration ($T_{MAX}$).

11. The method of claim 1, comprising the step of lowering said first high threshold level (TH) to said second lower threshold level (TL) in response to a rising edge (RE) of said crash signal (S2) following in time said precrash signal (S1).

12. The method of claim 11, where in said lowering step is performed by switching from a source of said first high threshold level (TH) to a source of said second lower threshold level (TL) in response to said rising edge (RE) of said crash signal (S2) following said precrash signal (S1).

* * * * *